United States Patent
Boroviak

(10) Patent No.: US 7,448,599 B2
(45) Date of Patent: *Nov. 11, 2008

(54) GATE BRACKET SYSTEMS AND METHODS

(75) Inventor: Richard Boroviak, Oakville (CA)

(73) Assignee: Homax Products, Inc., Bellingham, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/888,553

(22) Filed: Jul. 31, 2007

(65) Prior Publication Data

US 2008/0029751 A1 Feb. 7, 2008

Related U.S. Application Data

(63) Continuation of application No. 11/410,736, filed on Apr. 25, 2006, now Pat. No. 7,249,755, which is a continuation of application No. 11/087,483, filed on Mar. 22, 2005, now Pat. No. 7,032,892, which is a continuation of application No. 10/456,247, filed on Jun. 5, 2003, now Pat. No. 6,896,244, which is a continuation of application No. 09/976,380, filed on Oct. 11, 2001, now abandoned, which is a continuation-in-part of application No. 29/067,042, filed on Feb. 27, 1997, now Pat. No. Des. 520,349.

(30) Foreign Application Priority Data

Nov. 26, 1996 (CA) .................................. 19962618

(51) Int. Cl.
 *E04H 17/16* (2006.01)
(52) U.S. Cl. ........................... 256/73; 256/19; 256/26; 49/381; 403/231; 403/403

(58) Field of Classification Search .................. 256/19, 256/21, 24, 26, 65.02, 65.03, 65.07, 73; 403/231, 403/403; 49/381, 501; 52/656.2; 248/300
See application file for complete search history.

(56) References Cited

U.S. PATENT DOCUMENTS

| | | | | | |
|---|---|---|---|---|---|
| 375,903 | A | * | 1/1888 | Unfried | 49/160 |
| 853,810 | A | | 5/1907 | Lindenschmidt | |
| 1,237,837 | A | * | 8/1917 | Sundh | 256/21 |
| 2,329,260 | A | * | 9/1943 | Freeman | 256/24 |
| 2,709,313 | A | * | 5/1955 | Nead | 49/397 |

(Continued)

OTHER PUBLICATIONS

Artistic Iron Works, *Artistic Steel Gate Frames* Flyer, 1993, 2 pages.

(Continued)

*Primary Examiner*—Michael P Ferguson
(74) *Attorney, Agent, or Firm*—Michael R. Schacht; Schacht Law Office, Inc.

(57) ABSTRACT

A bracket system for forming gate assemblies comprising at least two brace members that are rigidly attached to hinge assemblies. The brace members are adapted to be attached to support members to form two corners of a gate box functioning as the structural portion of the gate assembly. The hinge assemblies are adapted to be rigidly attached to a fence post to allow the gate assembly to pivot relative to the fence post. Gate assemblies of arbitrary height and width can be formed using the bracket system.

14 Claims, 5 Drawing Sheets

U.S. PATENT DOCUMENTS

| | | | |
|---|---|---|---|
| 3,395,489 | A | 8/1968 | Banse |
| 3,851,415 | A | 12/1974 | Vihma |
| 3,949,526 | A | 4/1976 | Sherlock et al. |
| 4,369,953 | A | 1/1983 | Greiner et al. |
| 4,513,554 | A | 4/1985 | Johnson et al. |
| 7,032,892 | B2 * | 4/2006 | Boroviak ................. 256/73 |
| 2004/0129848 | A1 | 7/2004 | Boroviak |

OTHER PUBLICATIONS

Artistic Iron Works Gate Frame, www.artisticironworks.com., no date available.

W. McElroy, *Fences & Retaining Walls*, 1990, pp. 67-68, Craftsman Book Company, Carlsbad, CA.

C.R. Self et al., *Making Wood Decks, Fences & Gates*, 1989, p. 23, Sterling Publishing Company, Inc. NY.

R. Capotosto, "200 Original Shop Aids & Jigs for Woodworkers", *Popular Science*, 1983, pp. 304-305, 308, 310 and 312, Sterling Publishing Company, Inc. NY.

R. Wright-Smith, *Picture Framing*, 1980, p. 46, Orbis Publishing Limited, Italy.

Canadian Wood Council, *Wood Design Manual 1995*, p. 222, Canada.

Albert Jackson et al., *Wood Worker's Manual*, 1989, p. 52, William Collins Sons & Co. Ltd., London.

* cited by examiner

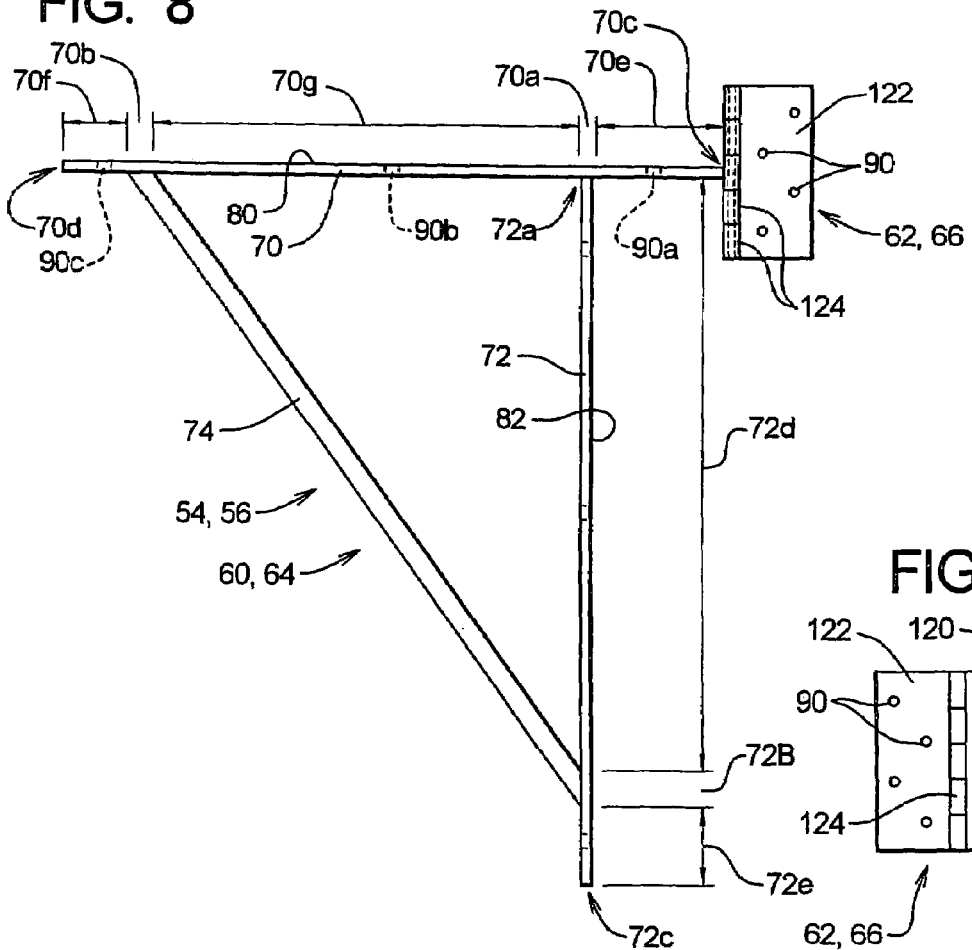
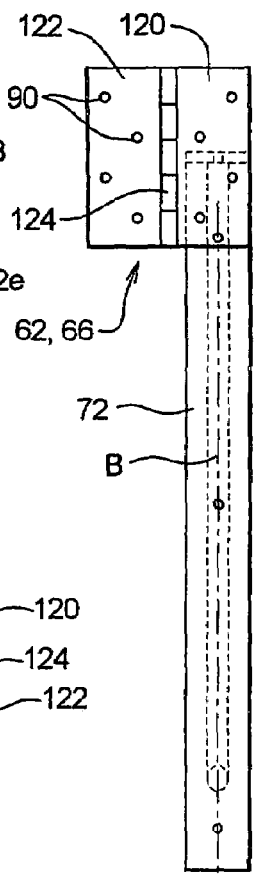
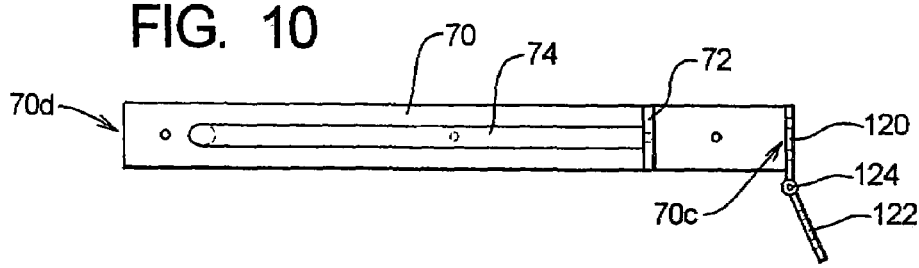
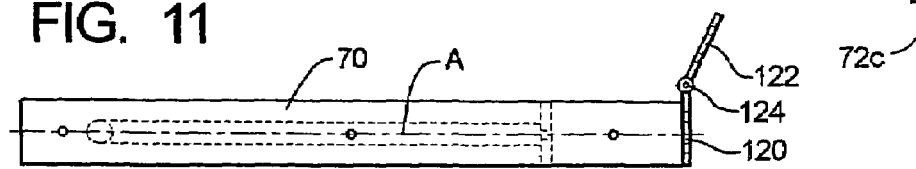

GATE BRACKET SYSTEMS AND METHODS

RELATED APPLICATIONS

This is a continuation of U.S. patent application Ser. No. 11/410,736 filed on Apr. 25, 2006 now U.S. Pat. No. 7,249,755, which is a continuation of U.S. patent application Ser. No. 11/087,483 filed on Mar. 22, 2005, now U.S. Pat. No. 7,032,892, which is a continuation of U.S. patent application Ser. No. 10/456,247 filed on Jun. 5, 2003, now U.S. Pat. No. 6,896,244, which is a continuation of U.S. patent application Ser. No. 09/976,380 filed on Oct. 11, 2001, now abandoned, which is a continuation-in-part of U.S. Design patent application Ser. No. 29/067,042 filed on Feb. 27, 1997 now U.S. Pat. No. D,520,349, which claims priority of Canadian Industrial Design Application No. 1996-2618 filed on Nov. 26, 1996.

TECHNICAL FIELD

The present invention relates to hardware for use in the construction of gates and, more specifically, to gate hardware adapted to brace the vertical and horizontal support members of a wooden gate and rotatably connect these members to a fixed structural member.

BACKGROUND OF THE INVENTION

Gates are often used to allow selective access through a wall or fence. Conventionally, gates are constructed as follows. Two vertical support members and two horizontal support members are fastened together in a rectangular shape to form what will be referred to herein as a gate box. Fence boards or the like are fastened to the support members, and one of the vertical support members is rotatably attached by two or more hinge assemblies to a structural member such as a wall or post.

Using conventional gate building techniques, fasteners such as nails or screws are driven through one support member into another support member to form the corners of the gate box. Over time, the force of gravity and wood shrinkage will cause these fasteners to loosen, allowing the gate box to sag out of its desired rectangular shape.

Accordingly, metal L-brackets, wooden brace members, triangular pieces of plywood, and the like are often fastened to the adjacent ends of the support members to strengthen the inside corners of the gate box. In other situations, a wire is placed in tension between the upper proximal and lower distal corners of the gate box to support the lower distal corner of the gate box and thereby reduce sagging of the gate. Such bracing techniques are somewhat effective but also commonly employ fasteners that are susceptible to failure and can be relatively time consuming to implement.

Another problem with conventional gate building techniques is that fasteners such as nails or screws are similarly used to attach the hinge assemblies to the vertical support member adjacent to the structural member. The loads are transferred to the gate through the screws placed in tension. As the wood shrinks and the gate is opened and closed, the fasteners under tension tend to loosen and may eventually fail.

As the hinge fasteners loosen, the entire gate assembly may sag relative to the hinge assemblies and thus the structural member, even if the gate box maintains its rectangular shape. The use of braces at the corners of the gate box will worsen sagging at the hinges because the materials and hardware used for bracing increase the weight of the gate; this increased weight increases the forces of gravity on the fasteners used to attach the hinge assemblies to the proximal vertical support member.

The Applicant is aware of a product sold in Canada as early as approximately 1993 under the tradename "Artistic Steel Gate Frames". The Artistic Steel Gate Frame product comprises distal and proximal brace members, with hinges being attached to the proximal brace member. A gate assembly constructed using the Artistic product would use upper and lower horizontal wooden support members, but would not use vertical support members. Instead, the distal and proximal brace members would form the structure of the vertical sides of the gate. Accordingly, the brace members of the Artistic product were sold in a plurality of sizes, with each size corresponding to a given distance between the upper and lower horizontal support members.

One problem with the Artistic product is that this system requires the manufacturer to produce and keep in inventory, and the retailer to stock, multiple sizes of brace members.

In addition, the end user is limited to one of these multiple sizes of brace members; one could not create a gate assembly having a custom distance between the upper and lower horizontal support members.

From the foregoing, it should be clear that one object of the present invention is to create bracket systems and methods that are strong, that are easy and inexpensive to use, and which allow significant flexibility in the final design of the gate assembly.

SUMMARY OF THE INVENTION

The present invention is a bracket system or method for forming gate assemblies. The bracket system comprises at least two brace members that are rigidly attached to hinge assemblies. The brace members are adapted to be attached to support members to form two corners of a gate box functioning as the structural portion of the gate assembly. The hinge assemblies are adapted to be rigidly attached to a fence post to allow the gate assembly to pivot relative to the fence post. Gate assemblies of arbitrary height and width can be formed using the bracket system of the present invention

BRIEF DESCRIPTION OF THE DRAWINGS

FIG. 8 is a front elevation view of the proximal brace member depicted in FIG. 1;

FIG. 9 is a side elevation view of the proximal brace member depicted in FIG. 1;

FIG. 10 is a bottom plan view of the proximal brace member depicted in FIG. 1; and FIG. 11 is a top plan view of the proximal brace member depicted in FIG. 1.

DETAILED DESCRIPTION OF THE INVENTION

Figure 1:
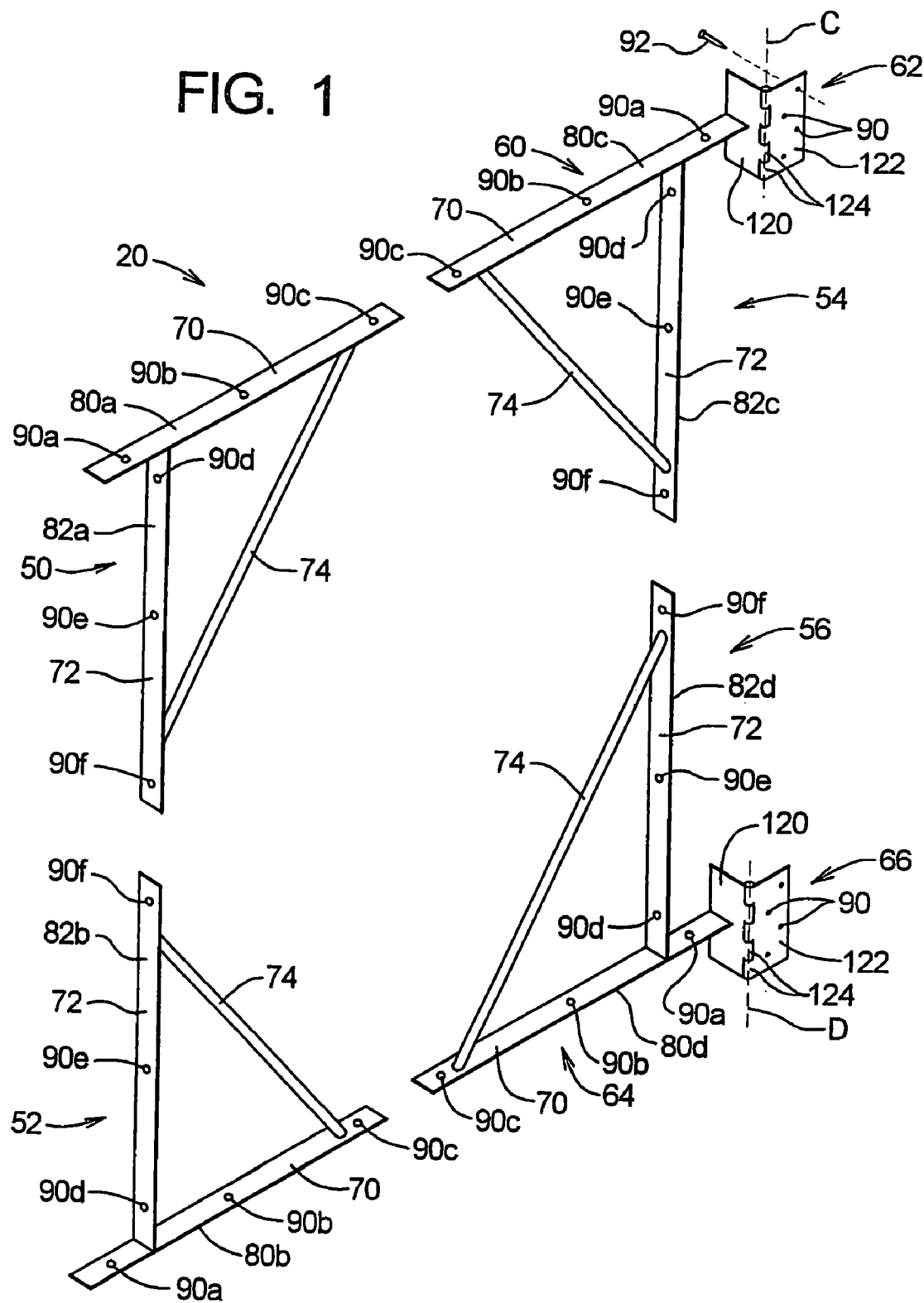
FIG. 1 is a perspective view of a gate frame system of the present invention comprising distal brace members and proximal brace assemblies.
Figure 2:
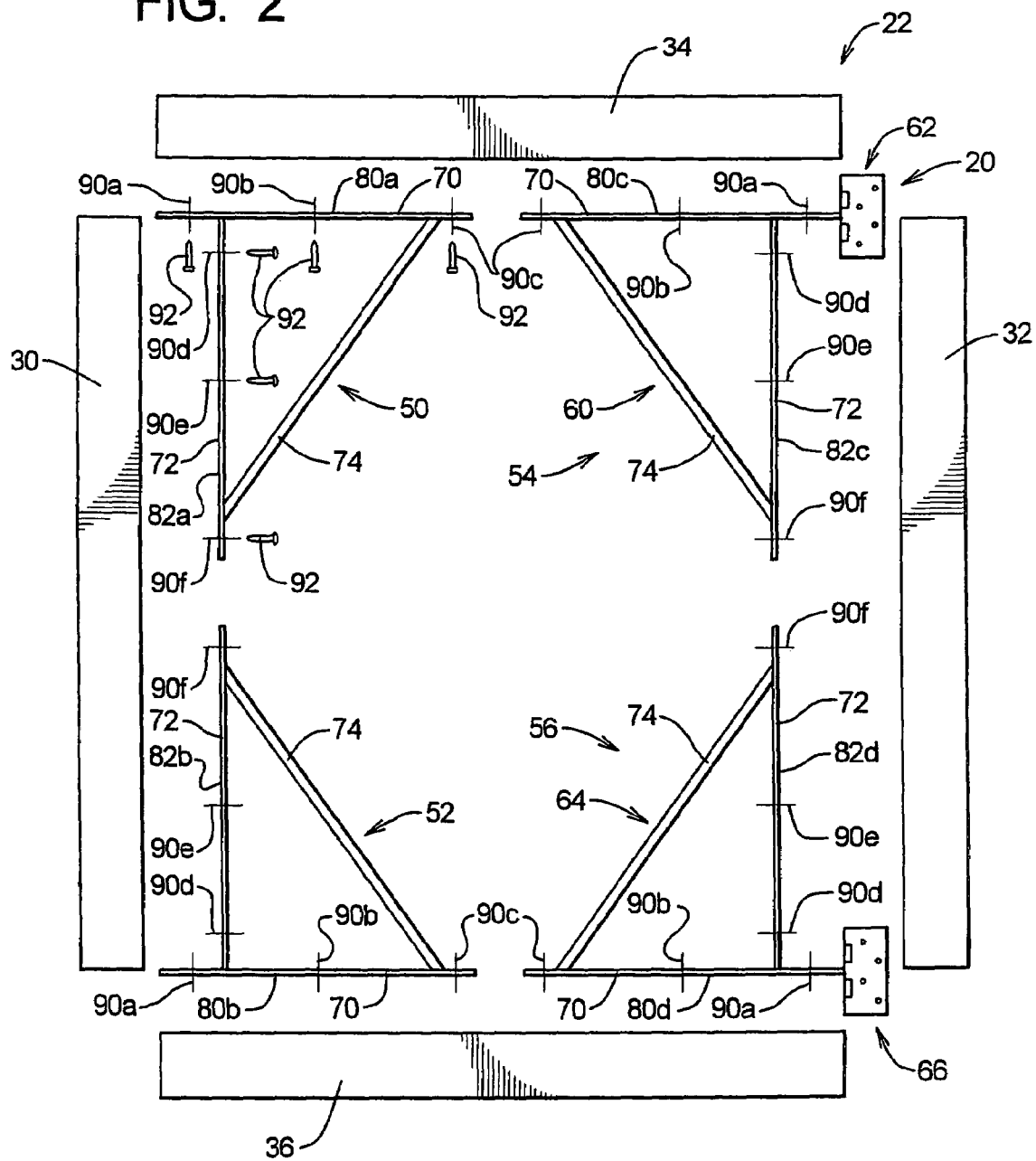
FIG. 2 is an exploded, front elevation view of a gate assembly incorporating the gate frame system of FIG. 1.
Figure 3:
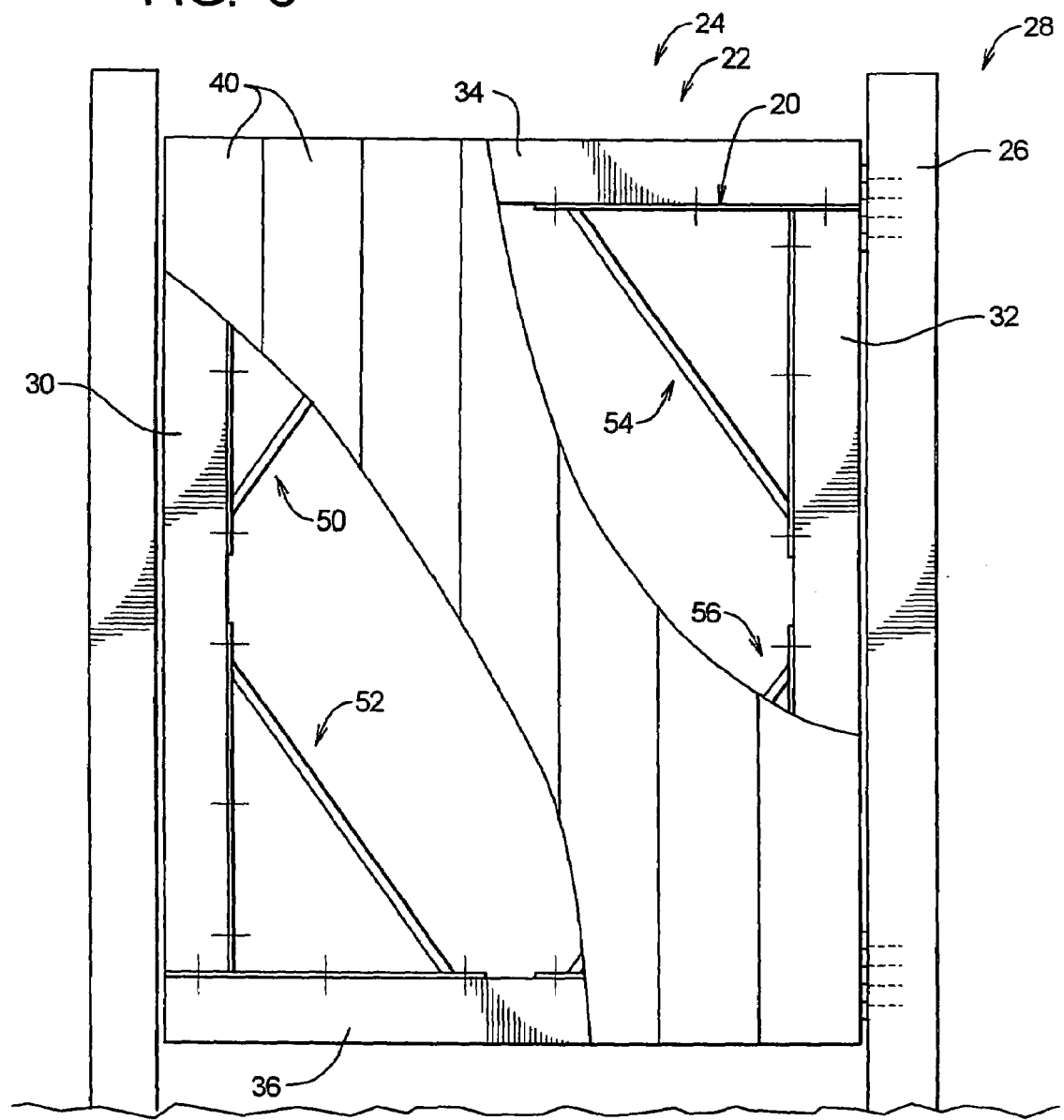
FIG. 3 is a partial cut-away, front elevation view of the gate assembly of FIG. 2 attached to a fence post.
Figure 4:
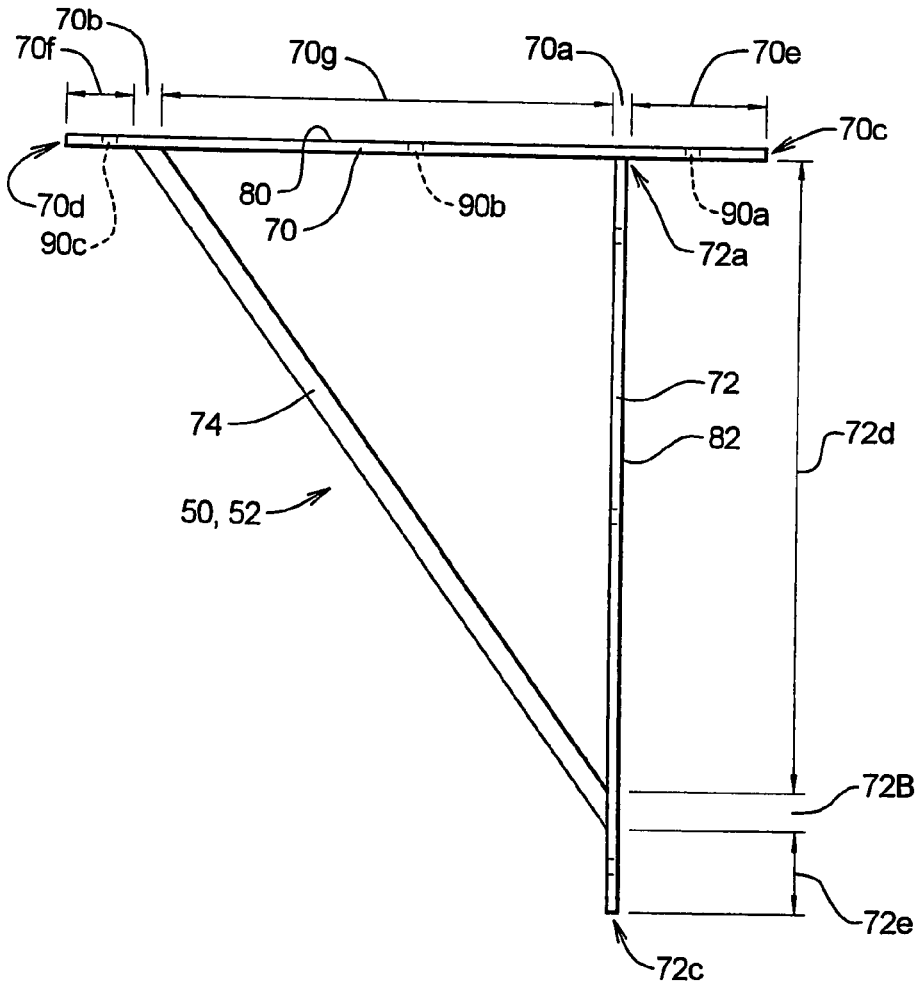
FIG. 4 is a front elevation view of the distal brace member depicted in FIG. 1.
Figure 7:
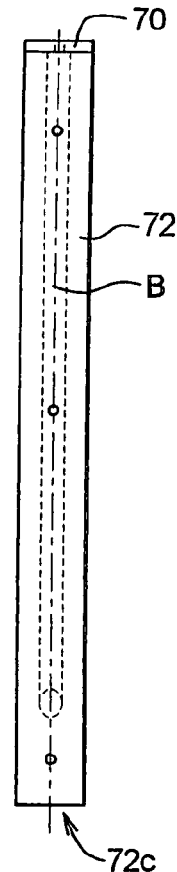
FIG. 7 is a top plan view of the distal brace member depicted in FIG. 1.
Figure 5:
FIG. 5 is a side elevation view of the distal brace member depicted in FIG. 1.
Figure 6:
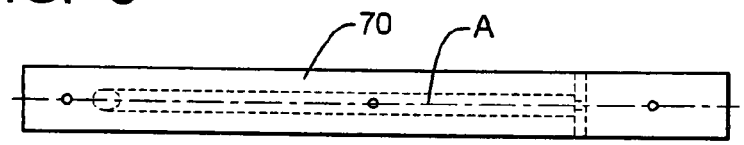
FIG. 6 is a bottom plan view of the distal brace member depicted in FIG. 1.

Referring initially to FIG. 1, depicted therein is a gate bracket system 20 constructed in accordance with, and embodying, the principles of the present invention. Referring for a moment to FIGS. 2 and 3, the gate bracket system 20 is adapted to form a gate box 22 to be used as part of a gate assembly 24; the gate assembly 24 is in turn to be connected to a structural member such as a fence post 26 (FIG. 3) of a larger structure such as a fence 28.

The exemplary gate assembly 24 comprises in addition to the bracket system 20 distal and proximal vertical support members 30 and 32, upper and lower horizontal support members 34 and 36, and a plurality of fence members 40. The exemplary support members 30-36 are conventional wooden two-by-fours, but other materials and sizes may be used as the support members 30-36. The exemplary fence members 40 are also conventionally made out of wood, but other materials and various sizes of any type of material may be used to form the fence members 40.

The support members 30-36 and fence members 40 do not form a part of the present invention. A description of the construction and operation of these members 30-40 is not necessary to describe how to make and use the present invention and is included herein simply to illustrate the environment in which the present invention operates.

The fence post 26 is conventionally a wooden four-by-four, but other materials and sizes may be used to form the structural member to which the gate assembly 24 is rotatably attached. For example, rather than a fence post 26, the structural member may be a wall of a structure. The fence post 26 and fence 28 also are or may be conventional and are not part of the present invention. As with the support and fence members 30-40 introduced above, a description of the construction and operation of the post 26 and fence 28 is not necessary to describe how to make and use the present invention. The fence post 26 and fence 28 are described herein simply to illustrate the environment in which the present invention operates.

The gate bracket system 20 of the present invention comprises first and second distal brace members 50 and 52 and first and second brace assemblies 54 and 56. The first brace assembly 54 in turn comprises a first proximal brace member 60 and a first hinge assembly 62, while the second brace assembly comprises a second proximal brace member 64 and a second hinge assembly 66.

The exemplary brace members 50, 52, 60, and 64 each comprise a horizontal portion 70, a vertical portion 72, and a brace portion 74. An outer end 72a of the vertical portions 72 is rigidly connected to an attachment region 70a of the horizontal portions 70. The exemplary brace portion 74 is preferably rigidly connected at an angle between bracing regions 70b and 72b of the horizontal and vertical portions 70 and 72, respectively.

The choice of materials and shapes of the materials are not essential to any particular implementation of the present invention. The primary requirements of the brace members 50, 52, 60, and 64 are that these members each define a horizontal support surface 80 and a vertical support surface 82 such that these surfaces rigidly extend from each other at a right angle. In the exemplary system 20, the horizontal support surfaces 80 are formed on the horizontal portions 70 and the vertical support surfaces 82 are formed on the vertical portions 72.

A plurality of fastener holes 90 are formed in the brace members 50, 52, 60, and 64; the fastener holes 90 are adapted to allow fasteners 92 to attach, in a conventional manner, the brace members 50, 52, 60, and 64 to the support members 30-36. The fasteners 92 are preferably self-tapping screws but can be nails, bolts, or the like. The fasteners 92 are not part of the gate bracket system 20 of the present invention per se but, as will be described in further detail below, are used to combine the bracket system 20 with the support members 30-36 to form the gate assembly 24.

The exact number and location of the fastener holes 90 is not critical to any given implementation of the present invention. In a broadest form of the bracket system 20, the fastener holes 90 can be formed anywhere along the horizontal portions 70 and vertical portions 72. The only requirement for the number and spacing of these holes is that the fasteners 92 extend through these holes 90 and into the support members to rigidly secure the brace members to the support members.

Given the foregoing general understanding of the present invention, the distal bracket members 50 and 52 and the proximal bracket assemblies 54 and 56 of the present invention will now be described in further detail with reference to FIGS. 4-11.

The attachment and bracing regions 70a and 70b of the horizontal portions 70 of the exemplary bracket members 50, 52, 60, and 64 are formed located generally as follows.

The horizontal portions 70 have an outer end 70c and an inner end 70d. The exemplary attachment regions 70a are located between approximately 15-30%, and preferably approximately 20%, of the distance between the horizontal portion ends 70c and 70d as measured from the outer ends 70c. The bracing regions 70b are located between approximately 80-95%, and preferably approximately 88%, of the distance between the horizontal portion ends 70c and 70d as measured from the outer ends 70c.

The horizontal portions 70 further define spacing regions 70e (between the attachment regions 70a and the outer ends 70c), inner regions 70f (between the bracing regions 70b and the inner ends 70d), and intermediate regions 70g (between the attachment regions 70a and the bracing regions 70b).

The length of the spacing regions 70e is determined such that the vertical support members 34 and 36 fit snugly between the vertical portions 72 and the outer ends 70c. In the case of the proximal bracket assemblies 54 and 56, the length of the spacing regions 70e allows the vertical support members 34 and 36 to fit snugly between the vertical portions 72 of the third and fourth bracket members 60 and 64 and the first and second hinge assemblies 62 and 66, respectively. When, as is typical, two-by-four dimensional lumber is used to form the vertical support members, the length of the spacing regions 70e will be approximately 3½", or slightly greater to allow for variations in the true dimensions of the lumber.

The vertical portions 72 each comprise the outer ends 72a discussed above and an inner end 72c. The bracing regions 72b are located approximately 85% of the distance between the horizontal portion ends 72a and 72c as measured from the outer ends 72a. The vertical portions 72 thus each define a main region 72d between the outer end 72a and the bracing region 72b and an inner end region 72e between the bracing region 72b and the inner end 72c.

In the horizontal portions 70 of the exemplary brace members 50, 52, 60, and 64, first, second, and third fastener holes 90a, 90b, and 90c are formed in the spacing regions 70e, inner regions 70f, and intermediate regions 70g, respectively. The first, second, and third fastener holes are spaced approximately 15%, 46%, and 96%, respectively, of the distance between the horizontal portion ends 70c and 70d as measured from the outer ends 70c.

In the vertical portions 72 of the exemplary brace members 50, 52, 60, and 64, fourth and fifth fastener holes 90d and 90e are formed in the main region 72*d* and a sixth fastener hole 90*f* is formed in the inner end region 72*e*. The fourth, fifth, and sixth fastener holes 90*d*, 90*e*, and 90*f* are spaced approximately 15%, 46%, and 96% of the distance between the horizontal portion ends 72*a* and 72*c* as measured from the outer ends 72*a*.

The fastener holes 90 of the exemplary brace members 50, 52, 60, and 64 are formed along a horizontal center line A of the horizontal portion 70 and a vertical center line B of the vertical portion 72.

The exemplary horizontal and vertical portions 70 and 72 are made of flat pieces of rigid metal, but other relatively rigid materials and shapes that function in a similar manner may be used. For ease of manufacturing, the exemplary horizontal and vertical portions 70 and 72 are identical in length, and the fastener holes 90 are formed at identical locations therein; only one part thus needs to be fabricated and stocked to form the exemplary brace members 50, 52, 60, and 64.

The brace portion 74 is typically round or flat metal stock, but other shapes and materials may be used. For example, the brace portion 74 may be a triangular web of flat material that extends between the horizontal and vertical portions 70 and 72. In this case, the entire brace member may be cast of metal or injection molded from plastic. If a triangular web or similar brace portion is used, it may be necessary to form the fastener holes 90 such that they are offset from the horizontal and vertical centerlines A and B.

From the foregoing, it should be clear that the exemplary brace members 50, 52, 60, and 64 are identical, which is preferred for manufacturing purposes. However, these brace members 50, 52, 60, and 64 need not be identical to practice the present invention in its broadest form.

The first and second hinge assemblies 54 and 56 are or may be conventional and will be described herein only to the extent necessary for a complete understanding of the present invention.

As is conventional, the hinge assemblies 54 and 56 each comprise a gate plate 120 and a post plate 122. These plates define hinge projections 124 that receive a hinge pin (not shown). The hinge pin allows the gate and post plates 120 and 122 to rotate relative to each other about a hinge axes C and D defined by the hinge assemblies 54 and 56.

The outer ends 70*c* of the horizontal portions 70 of the first and second brace members 60 and 64 are rigidly connected to the gate plates 120. In particular, the horizontal center lines A of the horizontal portions 70 of these brace members 60 and 64 are tangential to circles centered about the hinge axes C and D, respectively. The vertical center lines B of the vertical portions of the brace members 60 and 64 are parallel to the hinge axes C and D, respectively.

An array of fastener holes 90 is formed in the post plate 122 to allow this plate to be rigidly attached to the fence post 26. Preferably four fastener holes 90 are formed in the post plate 122. The drawing depicts fastener holes 90 in the gate plate 120; these holes 90 in the plate 120 need not be used, but will be present if off-the-shelf hinge assemblies 62 and 66 are used.

The process of combining the bracket system 20 with the support members 30-36 to form the gate box 22 will now be described with reference to FIG. 2.

Initially, as is conventional, the support members 30-36 are cut to the desired lengths. The length vertical support members 30 and 32 generally correspond to the height of the gate assembly 24, while the length of the horizontal support members 34 and 36 closely correspond to the width of the gate assembly 24. The minimum lengths of the support members 30-36 are determined by the horizontal portions 70 and vertical portions 72 of the brace members 50, 52, 60, and 64; in particular, the support members 30-36 must be at least twice as long as the lengths of the horizontal and vertical portions 70 and 72 to prevent overlapping of the horizontal portions 70 or vertical portions 72 of adjacent brace members.

The first and second distal brace members 50 and 52 and first and second brace assemblies 54 and 56 are arranged such that: (a) horizontal and vertical support surfaces 80*a* and 82*a* of the first distal brace member 50 define first and second support surfaces of the bracket system 20; (b) horizontal and vertical support surfaces 80*b* and 82*b* of the second distal brace member 50 define third and fourth support surfaces of the bracket system 20; (c) horizontal and vertical support surfaces 80*c* and 82*c* of the first proximal brace member 60 define third and fourth support surfaces of the bracket system 20; and (d) horizontal and vertical support surfaces 80*d* and 82*d* of the second proximal brace member 54 define third and fourth support surfaces of the bracket system 20.

The fasteners 92 are then inserted through the fastener holes 90 of the brace members 50, 52, 60, and 64 and into the support members 30-36 to form the gate box 22. In particular, fasteners 92 are driven through the holes 90 and into the support members 30-36 such that: (a) the upper horizontal support member 30 is drawn tight against the first and fifth support surfaces defined by the first distal brace member 50 and second proximal brace member 60; (b) the lower horizontal support member 32 is drawn tight against the second and sixth support surfaces defined by the second distal brace member 52 and fourth proximal brace member 64; (c) the distal vertical support member 34 is drawn tight against the third and fourth support surfaces defined by the first and second distal brace members 50 and 52; and (d) the proximal vertical support member 36 is drawn tight against the seventh and eight support surfaces defined by the first and second proximal brace members 60 and 64.

The exact order of the attachments described in the preceding paragraph is not critical to the present invention in its broadest form. However, with the brace members 50, 52, 60, and 64 described herein, fasteners 92 are preferably driven through at least the first fastener holes 90*a* formed in the spacing regions 70*e* of the horizontal portions 70 before fasteners 92 are driven through the fastener fourth, fifth, or sixth fastener holes 90*d-e* of the vertical portions 72. Otherwise, the vertical support members 34 and 36 may block access to the first fastener holes 90*a*. Preferably, fasteners 92 are driven through the first through third fastener holes 90*a-c* before fasteners are driven through the fifth through sixth fastener holes 90*d-e*.

With the gate box 22 formed as described above, the hinge axes C and D will be substantially aligned. The gate box 22 so formed may thus then be attached to the fence post 26 by fasteners 92 extending through the fastener holes 90 in the post plate 122 and into the post 26. When the post plates 122 are rigidly connected to the post 26, the gate box 22 pivots relative to the fence post 26 about the hinge axes C and D.

The gate assembly 24 may be formed before or after the gate box 22 is attached to the fence post 26 by attaching the fence members 40 to at least one, and preferably at least two, of the support members 30-36 of the gate box 22.

Given the foregoing, it should be clear that the present invention may be embodied in forms other than those depicted and described herein. The scope of the present invention should thus be determined by the claims appended hereto and not the preceding detailed description of the preferred embodiment.

I claim:

1. A bracket system for rotatably connecting a gate assembly comprising a plurality of support members to a structural member, the bracket system comprising:
   first and second brace assemblies, where each brace assembly comprises:
      a brace member defining a first support surface, a second support surface, and a spacing portion, and
      a hinge assembly rigidly connected to the brace member, wherein:
         the brace member is configured to maintain a fixed angular relationship between the first and second support surfaces,
         the first support surface engages a surface of one of the support members,
         the second support surface engages a surface of another one of the support members, and
         the hinge assembly is adapted to be connected to the structural member; whereby:
   the first and second brace assemblies are movable relative to each other when the first and second brace assemblies are not connected to the support members; and
   when the first and second brace assemblies are connected to the support members:
      a spatial relationship of the first brace assembly and the second brace assembly is fixed;
      the spacing portions of the brace members space the hinge assemblies a spacing distance from the second support surfaces; and the spacing distance is configured to accommodate one of the support members, wherein the one support member snugly fits between the hinge assemblies and a portion of the brace members defining the second support surfaces.

2. A bracket system as recited in claim 1, in which the hinge assemblies each define a hinge axis, where the hinge axes are aligned when the hinge assemblies of the first and second brace assemblies are connected to the structural member.

3. A bracket system as recited in claim 1, in which the hinge assemblies are rigidly connected to the spacing portions of the brace members.

4. A bracket system as recited in claim 1, in which fastening holes are formed in the brace members to facilitate connection of the brace members to the support members.

5. A bracket system as recited in claim 1, further comprising:
   first and second distal brace members, where each distal brace member defines a first support surface and a second support surface, wherein:
      the distal brace member is configured to maintain a fixed relationship between the first and second support surfaces thereof,
      the first support surface of the distal brace member engages a surface of one of the support members, and
      the second support surface of the distal brace member engages a surface of one of the support members; whereby:
   the first and second distal brace members are movable relative to each other and to the first and second brace assemblies when not connected to the support members; and
   when the first and second brace assemblies and the first and second distal brace members are connected to the support members, a spatial relationship of the first and second brace assemblies and the first and second distal brace members is fixed.

6. A method of connecting a gate assembly to a structural member, the method comprising the steps of:
   providing first and second brace assemblies each comprising:
      a brace member, where each brace member defines a first support surface, a second support surface, and a spacing portion, where the first and second brace assemblies are configured to maintain a fixed angular relationship between the first and second support surfaces, and
      a hinge assembly adapted to be connected to the structural member, where the hinge assembly is rigidly connected to the brace member such that the spacing portions of the brace members space the hinge assemblies a spacing distance from the second support surface;
   determining horizontal and vertical dimensions of the gate assembly;
   forming upper and lower horizontal support members and distal and proximal vertical support members based on dimensions of the gate assembly
      where the spacing distance is configured to accommodate the proximal vertical support member, wherein the proximal vertical support member snugly fits between the hinge assemblies and portions of the brace members defining the second support surface;
   rigidly connecting:
      the brace members of the brace assemblies to the upper horizontal support member, the lower horizontal support member, and the proximal vertical support member,
      the hinge assemblies of the brace assemblies to the structural member, and
      the distal vertical support member to the upper and lower horizontal support members such that inner surfaces of the upper and lower horizontal support members opposes each other, and
         inner surfaces of the proximal and distal vertical support members oppose each other; whereby
   the length of the proximal vertical support member determines a spatial relationship between the first and second brace assemblies.

7. A method as recited in claim 6, in which the hinge assemblies each define a hinge axis, further comprising the step of aligning the hinge axes when the hinge assemblies of the first and second brace assemblies are connected to the structural member.

8. A method as recited in claim 6, further comprising the step of rigidly connecting the hinge assemblies to the spacing portions of the brace members.

9. A method as recited in claim 6, further comprising the step of forming a plurality of fastening holes in the brace members to facilitate connection of the brace members to the support members.

10. A method as recited in claim 7, further comprising the steps of:
   providing first and second distal brace members, where:
      each distal brace member defines a first support surface and a second support surface,
      the distal brace member is configured to maintain a fixed relationship between the first and second support surfaces thereof,
      the first support surface of the distal brace member engages a surface of one of the support members, and
      the second support surface of the distal brace member engages a surface of one of the support members, and the first and second distal brace members are movable relative to each other and to the first and second brace assemblies when not connected to the support members; and connecting the first and second brace assemblies and the first and second distal brace members to the support members such that a spatial relationship of the first and second brace assemblies and the first and second distal brace members is fixed.

11. A bracket system for rotatably connecting a gate assembly comprising a plurality of support members to a structural member, the bracket system comprising:

first and second brace assemblies, where each brace assembly comprises:
 a proximal brace member defining a first support surface, a second support surface, and a spacing portion, and
 a hinge assembly rigidly connected to the proximal brace member, wherein:
 the proximal brace member is configured to maintain a fixed angular relationship between the first and second support surfaces thereof,
 the first support surface of the proximal brace member engages a surface of one of the support members,
 the second support surface of the proximal brace member engages a surface of another one of the support members, and
 the hinge assembly is adapted to be connected to the structural member; and first and second distal brace members, where each distal brace member defines a first support surface and a second support surface, wherein:
 the distal brace member is configured to maintain a fixed angular relationship between the first and second support surfaces thereof,
 the first support surface of the distal brace member engages a surface of one of the support members, and
 the second support surface of the distal brace member engages a surface of another one of the support members; whereby:

the first and second brace assemblies and first and second distal brace members are movable relative to each other when not connected to the support members; and when the first and second brace assemblies and the first and second distal brace members are connected to the support members
 a spatial relationship of the first and second brace assemblies and the first and second distal brace members is fixed;
 the spacing portions of the proximal brace members space the hinge assemblies a spacing distance from the second support surfaces of the proximal brace members; and
 the spacing distance is configured to accommodate one of the support members, wherein the one support member snugly fits between the hinge assemblies and a portion of the proximal brace members defining the second support surfaces.

12. A bracket system as recited in claim 11, in which the hinge assemblies each define a hinge axis, where the hinge axes are aligned when the hinge assemblies of the first and second brace assemblies are connected to the structural member.

13. A bracket system as recited in claim 11, in which the hinge assemblies are rigidly connected to the spacing portions of the proximal brace members.

14. A bracket system as recited in claim 11, in which fastening holes are formed in the proximal brace members to facilitate connection of the proximal brace members to the support members.

* * * * *

UNITED STATES PATENT AND TRADEMARK OFFICE
CERTIFICATE OF CORRECTION

PATENT NO. : 7,448,599 B2  Page 1 of 1
APPLICATION NO. : 11/888553
DATED : November 11, 2008
INVENTOR(S) : Richard Boroviak It is certified that error appears in the above-identified patent and that said Letters Patent is hereby corrected as shown below:

On the title page, please remove the following item (73):

(73) Assignee:  Homax Products, Inc., Bellingham, WA (US)

Signed and Sealed this

Twenty-fifth Day of May, 2010

David J. Kappos
*Director of the United States Patent and Trademark Office*